United States Patent
Watanabe et al.

(10) Patent No.: US 11,391,837 B2
(45) Date of Patent: Jul. 19, 2022

(54) ULTRASONIC DEVICE AND ULTRASONIC MEASUREMENT METHOD

(71) Applicant: Seiko Epson Corporation, Tokyo (JP)

(72) Inventors: Ryoki Watanabe, Matsumoto (JP); Kanechika Kiyose, Matsumoto (JP)

(73) Assignee: Seiko Epson Corporation

( * ) Notice: Subject to any disclaimer, the term of this patent is extended or adjusted under 35 U.S.C. 154(b) by 522 days.

(21) Appl. No.: 16/227,503

(22) Filed: Dec. 20, 2018

(65) Prior Publication Data

US 2019/0196009 A1  Jun. 27, 2019

(30) Foreign Application Priority Data

Dec. 27, 2017  (JP) .............................. JP2017-250709

(51) Int. Cl.
| | |
|---|---|
| *G01S 15/00* | (2020.01) |
| *G01S 15/10* | (2006.01) |
| *B41J 29/393* | (2006.01) |
| *G01S 7/527* | (2006.01) |
| *B41J 2/16* | (2006.01) |
| *G01S 15/88* | (2006.01) |
| *B41J 29/38* | (2006.01) |

(52) U.S. Cl.
CPC ................. *G01S 15/10* (2013.01); *B41J 2/16* (2013.01); *B41J 29/38* (2013.01); *B41J 29/393* (2013.01); *G01S 7/527* (2013.01); *G01S 15/88* (2013.01)

(58) Field of Classification Search
None
See application file for complete search history.

(56) References Cited

U.S. PATENT DOCUMENTS

| | | | | |
|---|---|---|---|---|
| 4,220,979 A | * | 9/1980 | Kitamura .................. | G11B 5/03 360/66 |
| 4,639,604 A | * | 1/1987 | Murakami ............. | G01B 11/02 250/548 |
| 5,587,969 A | * | 12/1996 | Kroemer ............... | G01F 23/296 367/908 |

(Continued)

FOREIGN PATENT DOCUMENTS

| | | | | |
|---|---|---|---|---|
| DE | 102006042446 A1 | * | 3/2008 | ........... G01B 17/025 |
| JP | S60-200188 A | | 10/1985 | |

(Continued)

OTHER PUBLICATIONS

Siciliano, Bruno, Oussama Khatib, and Torsten Kroger, eds. Springer handbook of robotics. vol. 200. Berlin: springer, 2008. Chapter 21. Sonar Sensing, pp. 1-30. (Year: 2008).*

*Primary Examiner* — Isam A Alsomiri
*Assistant Examiner* — Jonathan D Armstrong
(74) *Attorney, Agent, or Firm* — Harness, Dickey & Pierce, P.L.C.

(57) ABSTRACT

An ultrasonic device includes an ultrasonic transceiver that transmits an ultrasonic wave to a target at a predetermined interval, and that receives the ultrasonic wave reflected on the target so as to output a reception signal, a signal integration unit that outputs an integrated signal obtained by integrating the reception signals output within a predetermined period, and a position detection unit that detects a position of the target, based on a magnitude relationship between signal intensity of the integrated signal and a predetermined reference value.

4 Claims, 12 Drawing Sheets

(56) References Cited

U.S. PATENT DOCUMENTS

| | | | | |
|---|---|---|---|---|
| 5,798,730 | A * | 8/1998 | Sanchez | G01S 7/2923 327/24 |
| 5,800,356 | A * | 9/1998 | Criton | A61B 8/486 600/441 |
| 5,803,334 | A * | 9/1998 | Patel | B65H 23/0204 226/45 |
| 5,834,877 | A * | 11/1998 | Buisker | B06B 1/0622 310/322 |
| 6,390,984 | B1 * | 5/2002 | Pan | A61B 8/06 600/453 |
| 7,331,578 | B2 * | 2/2008 | Sano | B65H 7/125 271/262 |
| 7,404,559 | B2 * | 7/2008 | Yoshimura | B65H 7/125 271/262 |
| 7,845,637 | B2 * | 12/2010 | Shimazaki | B65H 7/12 271/262 |
| 7,891,663 | B2 * | 2/2011 | Tsuruoka | B65H 7/12 271/265.04 |
| 8,490,491 | B2 * | 7/2013 | Thomas | G01N 29/4463 73/602 |
| 8,570,622 | B2 * | 10/2013 | Pellaton | B65H 7/12 358/498 |
| 8,657,285 | B2 * | 2/2014 | Matsuoka | B65H 5/06 271/265.04 |
| 9,238,563 | B2 * | 1/2016 | Zwerger | G01N 29/27 |
| 9,542,787 | B2 * | 1/2017 | Blair | G07D 7/08 |
| 9,873,580 | B2 * | 1/2018 | Hayashi | B65H 3/063 |
| 10,059,547 | B2 * | 8/2018 | Hayashi | B65H 5/06 |
| 10,730,712 | B2 * | 8/2020 | Arima | G01N 29/48 |
| 2004/0145110 | A1 * | 7/2004 | Phinney | G01N 29/11 271/153 |
| 2004/0150155 | A1 * | 8/2004 | Okitsu | B65H 7/125 271/262 |
| 2005/0211404 | A1 * | 9/2005 | Makkonen | D21F 1/365 162/198 |
| 2006/0211942 | A1 * | 9/2006 | Hoctor | A61B 8/4236 600/438 |
| 2007/0123779 | A1 * | 5/2007 | Hoctor | A61B 8/13 600/438 |
| 2011/0203378 | A1 * | 8/2011 | Buccafusca | G01H 9/00 73/655 |
| 2012/0095337 | A1 * | 4/2012 | Alexandru | G01S 15/8915 600/442 |
| 2013/0322215 | A1 * | 12/2013 | Du | G10L 25/78 367/136 |
| 2014/0269205 | A1 * | 9/2014 | Blair | G07D 7/08 367/137 |
| 2015/0116411 | A1 * | 4/2015 | Suzuki | B41J 11/0045 347/16 |
| 2016/0380640 | A1 * | 12/2016 | Boser | G01S 7/52004 367/13 |
| 2017/0141835 | A1 * | 5/2017 | Gal-Yam | H04B 7/0851 |
| 2018/0142412 | A1 * | 5/2018 | Heaven | D21G 9/0027 |
| 2019/0283466 | A1 * | 9/2019 | Watanabe | B41J 2/04556 |

FOREIGN PATENT DOCUMENTS

| | | |
|---|---|---|
| JP | 2010-139410 A | 6/2010 |
| WO | WO-2015-045781 A1 | 4/2015 |

* cited by examiner

ULTRASONIC DEVICE AND ULTRASONIC MEASUREMENT METHOD

BACKGROUND

1. Technical Field

The present invention relates to an ultrasonic device and an ultrasonic measurement method.

2. Related Art

In the related art, an ultrasonic device (edge detection sensor) is known which detects an edge (outer edge) of a target by using an ultrasonic wave (for example, refer to JP-A-2010-139410).

JP-A-2010-139410 discloses a printer which forms an image on a sheet. The printer has an edge sensor which detects the edge of the sheet. The edge sensor includes a transmitter which transmits the ultrasonic wave, a receiver which receives the ultrasonic wave, and a support member which connects the transmitter and the receiver to each other. The transmitter and the receiver are arranged across a transport path of the sheet. The transmitter transmits the ultrasonic wave to a predetermined detection region, and the receiver receives the ultrasonic wave passing through the detection region. In this manner, if a position of the sheet deviates on the transport path, a signal value of the ultrasonic wave received at the receiver is changed. Accordingly, it is possible to determine whether or not the position of the sheet is suitable.

However, according to the edge sensor as described above, if the ultrasonic wave is transmitted from the transmitter, the ultrasonic wave reflected multiple times between the target and the receiver, between the target and the transmitter, and between the transmitter and the receiver is also received by the receiver. In addition, the number of reflected multiple times is not uniform. For example, the ultrasonic wave is present which is reflected multiple times between the transmitter and the receiver after being reflected multiple times between the target and the transmitter. In this case, it is difficult to detect the position of the target, based on only signal intensity output from the receiver.

SUMMARY

An advantage of some aspects of the invention is to provide an ultrasonic device and an ultrasonic measurement method which are capable of more accurately detecting a position of a target.

An ultrasonic device according to an application example of the invention includes an ultrasonic transceiver that transmits an ultrasonic wave to a target at a predetermined interval, and that receives the ultrasonic wave reflected on the target so as to output a reception signal, a signal integration unit that outputs an integrated signal obtained by integrating the reception signals output within a predetermined period, and a position detection unit that detects a position of the target, based on a magnitude relationship between signal intensity of the integrated signal and a predetermined reference value.

In the application example, the ultrasonic transceiver transmits the ultrasonic wave at a predetermined interval, and receives the ultrasonic wave reflected on the target. In this case, the ultrasonic wave is reflected multiple times between the ultrasonic transceiver and the target. Accordingly, after the ultrasonic wave reflected first time (primary reflection component) is received, the ultrasonic waves sequentially reflected multiple times are received. Therefore, when the ultrasonic wave having the primary reflection component is received, the reception signal is output. Thereafter, the reception signals are output in order at a timing at which the ultrasonic wave having each multiple reflection component is received.

Here, in the application example, the integrated signal obtained by integrating the reception signals output within the predetermined period is output, and the signal intensity of the integrated signal is compared with the reference value so as to detect the position of the target, based on the magnitude relationship. In this case, in a case where the target deviates in a direction away from a transmission/reception area of the ultrasonic wave, the ultrasonic waves reflected on the target decrease. Accordingly, the signal intensity of the integrated signal decreases. Conversely, in a case where the target deviates so as to enter the transmission/reception area of the ultrasonic wave, the signal intensity of the integrated signal increases. Here, in a case where the position of the target is detected only by using the reception signal as in the related art, if a position where the ultrasonic wave is reflected multiple times is changed, the signal intensity of the reception signal is also changed. Consequently, the position cannot be accurately detected. In contrast, the application example adopts the integrated signal obtained by integrating the reception signals output within the predetermined period. In this case, if the position of the target is not changed, the signal intensity of the integrated signal maintains a constant value. Therefore, the position of the target can be more accurately detected.

It is preferable that the ultrasonic device according to the application example further includes a multiple identification unit that identifies the reception signal generated by a multiple reflection ultrasonic wave reflected multiple times between the target and the ultrasonic transceiver, in which the signal integration unit integrates the reception signal output during a period until the multiple reflection ultrasonic wave in a first degree is received by the ultrasonic transceiver after the ultrasonic wave is transmitted.

In the application example with this configuration, the signal integration unit outputs the reception signals until the multiple reflection ultrasonic wave is received up to the first degree (n-th order), that is, the signal integration unit outputs the integrated signal obtained by receiving the first to n-th reception signals. In this way, the degree of the reception signals to be integrated is fixed. Accordingly, the signal intensity of the integrated signal is stabilized in a case where the position of the target is not changed. Therefore, the position can be accurately detected.

It is preferable that the ultrasonic device according to the application example further includes a degree setting unit that sets a maximum degree in which the signal intensity of the reception signal of the multiple reflection ultrasonic wave is equal to or greater than a first threshold when the ultrasonic wave having a single pulse is transmitted to the target, as the first degree.

In the application example with this configuration, the degree of the multiple reflection component which can obtain the reception signal whose signal intensity is equal to or greater than the first threshold is set as the first degree. In this case, the multiple reflection component subsequent to the first degree can be eliminated by means of gain adjustment or by using a low-pass filter, for example. Therefore, the first to n-th reception signals can be obtained using a simple configuration.

In the ultrasonic device according to the application example, it is preferable that an interval of the ultrasonic wave transmitted by the ultrasonic transceiver is shorter than a time required until the reception signal of a secondary multiple reflection ultrasonic wave is received after the ultrasonic wave is transmitted from the ultrasonic transceiver.

In the application example with this configuration, an output interval of the ultrasonic wave is equal to or shorter than the time required until the reception signal of the secondary multiple reflection ultrasonic wave is received after the ultrasonic wave is transmitted. In this manner, when the position of the target is not fluctuating, the signal intensities of the integrated signals are the same or substantially the same as each other. Therefore, when the position of the target moves, position deviation can be preferably detected.

In the ultrasonic device according to the application example, it is preferable that the reference value represents the signal intensity of the integrated signal when the target is located while covering ½ of a transmission range in which the ultrasonic wave is transmitted by the ultrasonic transceiver.

In the application example with this configuration, the reference value is set to be the signal intensity of the integrated signal when the target is located at the position which covers ½ of the transmission range of the ultrasonic wave. In this case, the detection range of the position of the target which is detectable when the target is away from the transmission range can be the same as the detection range of the position of the target which is detectable when the target further enters the transmission range.

A ultrasonic measurement method according to an application example of the invention is an ultrasonic measurement method of detecting a position of a target by using an ultrasonic device including an ultrasonic transceiver that transmits an ultrasonic wave to the target, and that receives the ultrasonic wave reflected on the target so as to output a reception signal. The ultrasonic measurement method includes transmitting the ultrasonic wave from the ultrasonic transceiver to the target at a predetermined interval, outputting an integrated signal obtained by integrating the reception signals output within a predetermined period, and detecting the position of the target, based on a magnitude relationship between signal intensity of the integrated signal and a predetermined reference value.

In the application example, similar to the above-described application example, the application adopts the integrated signal obtained by integrating the reception signals within the predetermined period. Accordingly, if the position of the target is not changed, the signal intensity of the integrated signal maintains a constant value. Therefore, the position of the target can be more accurately detected.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment according to the invention will be described.

In the present embodiment, a printer will be described which is an electronic device in which an edge detection sensor is incorporated as an ultrasonic device according to the invention.

Schematic Configuration of Printer

Figure 1:
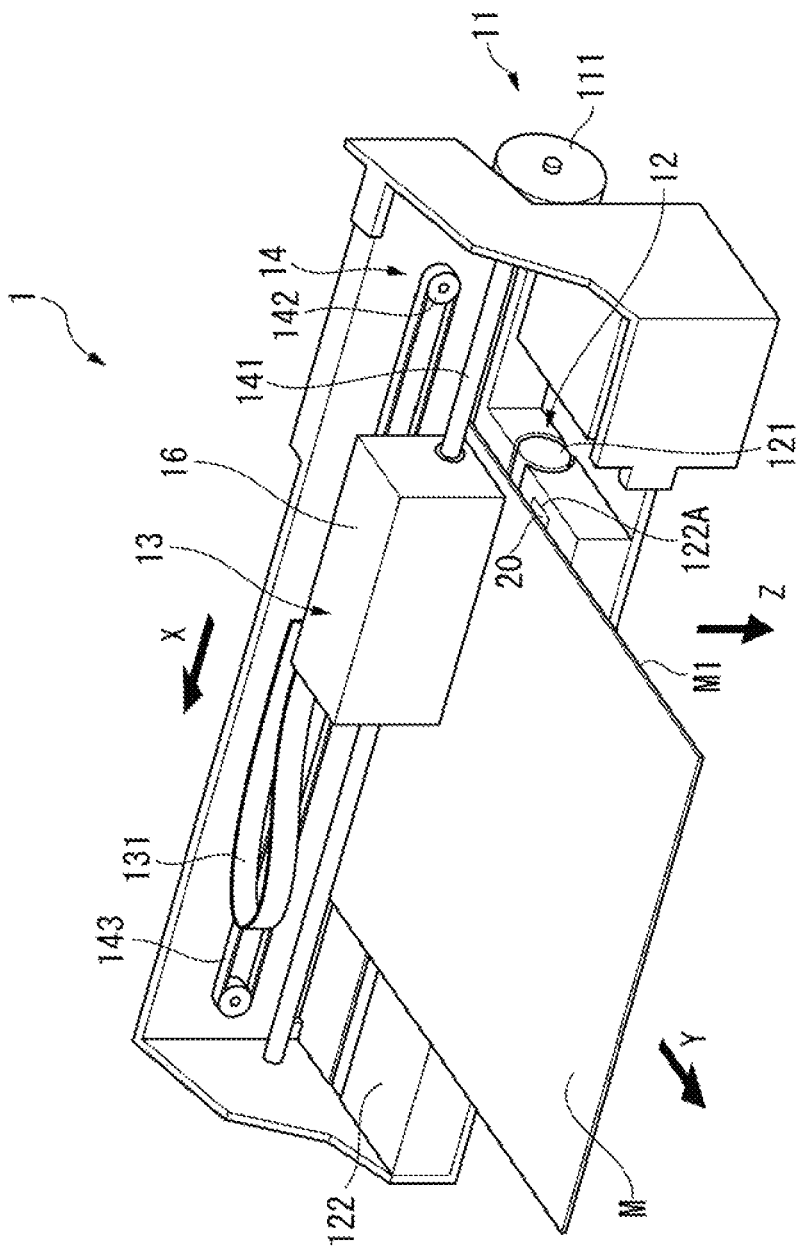
FIG. 1 is a perspective view illustrating an external configuration example of a printer according to the present embodiment.
Figure 2:
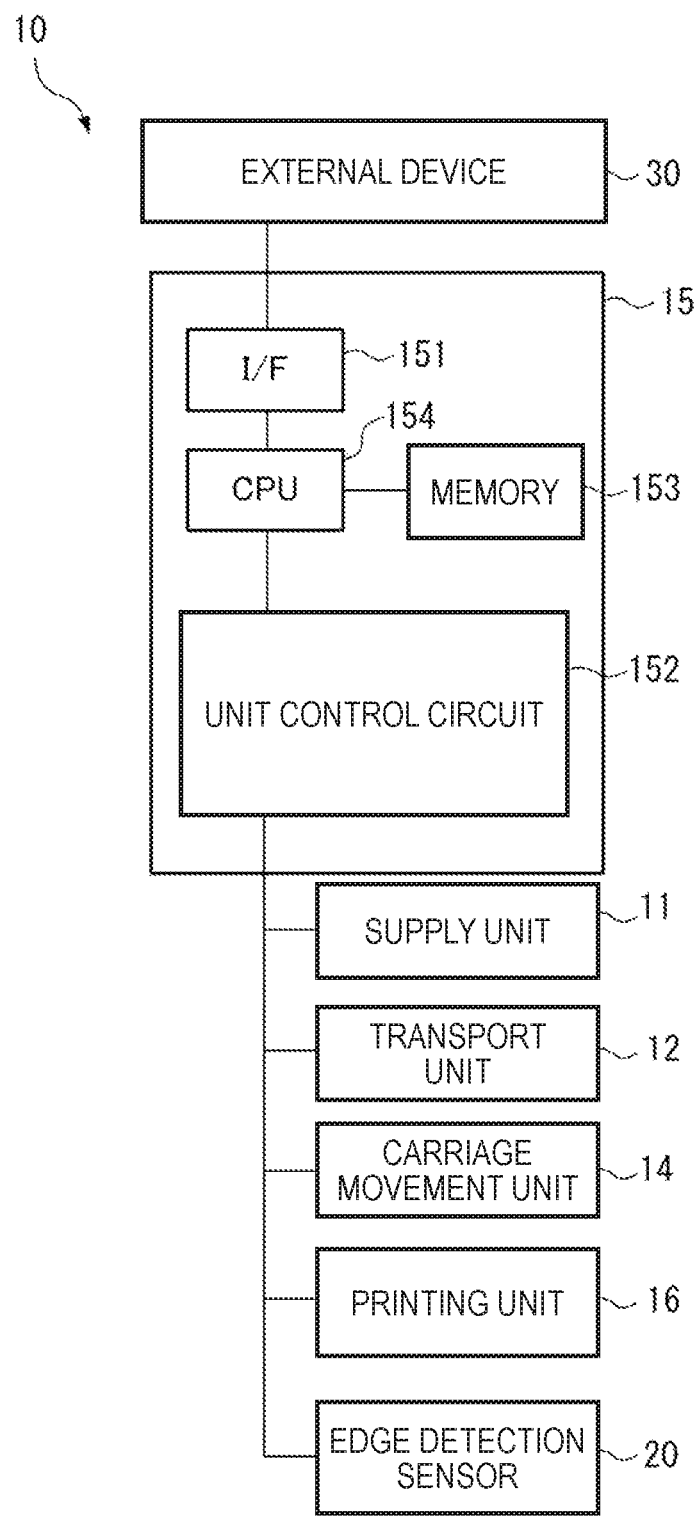
FIG. 2 is a block diagram illustrating a schematic configuration of the printer according to the present embodiment.

FIG. 1 is a perspective view illustrating an external configuration example of a printer 10 according to the present embodiment. FIG. 2 is a block diagram illustrating a schematic configuration of the printer 10 according to the present embodiment.

As illustrated in FIG. 1, the printer 10 includes a supply unit 11, a transport unit 12, a carriage 13, a carriage movement unit 14, and a control unit 15 (refer to FIG. 2).

The printer 10 controls the respective units 11, 12, and 14, and the carriage 13, based on print data input from an external device 30, such as a personal computer, and prints an image on a medium M. In this case, in order to form the image at a desired position on the medium M (target), the printer 10 causes an edge detection sensor 20 disposed in the transport unit 12 to detect a position of an edge (edge portion M1) of the medium M. If the edge detection sensor 20 determines that the edge portion M1 of the medium M deviates from a reference position, the control unit 15 issues an alarm, for example, to a user so as to correct the position of the medium M.

Hereinafter, each configuration of the printer 10 will be described in detail.

The supply unit 11 supplies the medium M serving as an image forming target to an image forming position. For example, the supply unit 11 includes a roll body 111 (refer to FIG. 1) around which the medium M is wound, a roll drive motor (not illustrated), and a roll drive train wheel (not illustrated). Based on a command from the control unit 15, the roll drive motor is rotationally driven, thereby rotating the roll body 111 via the roll drive train wheel. In this manner, a sheet wound around the roll body 111 is supplied to a downstream side (+Y-side) in a sub-scanning direction (Y-direction).

In the present embodiment, an example will be described in which the supply unit 11 supplies the sheet wound around the roll body 111. However, the invention is not limited thereto. For example, the medium M such as the sheet loaded on a tray may be supplied one by one by using roller. The medium M may be supplied using any supply method.

The transport unit 12 transports the medium M supplied from the supply unit 11 along the Y-direction. For example, the transport unit 12 includes a transport roller 121, a driven roller (not illustrated) driven to follow the transport roller 121 while being located across the transport roller 121 and the medium M, and a platen 122.

The transport roller 121 is rotated in such a way that a transport motor (not illustrated) is controlled and driven by the control unit 15, and transports the medium M in the Y-direction in a state where the medium M is interposed between the driven roller and the transport roller 121.

The platen 122 (placement table) facing the carriage 13 is disposed on the downstream side (+Y-side) of the transport roller 121 in the Y-direction. In the present embodiment, the edge detection sensor 20 is disposed in the platen 122.

The edge detection sensor 20 will be described in detail later.

The carriage 13 is equipped with a printing unit 16 which prints an image by ejecting an ink to the medium M.

Based on a command signal output from the control unit 15, the printing unit 16 performs a printing process (image forming process for the medium M) as follows. The printing unit 16 in a portion facing the medium M ejects the ink individually onto the medium M so as to form an image on the medium M.

Based on a command output from the control unit 15, the carriage movement unit 14 causes the carriage 13 to reciprocate along the X-direction.

For example, as illustrated in FIG. 1, the carriage movement unit 14 is configured to include a carriage guide shaft 141, a carriage motor 142, and a timing belt 143.

The carriage guide shaft 141 is located along the X-direction, and both ends thereof are fixed to, a casing of the printer 10, for example. The carriage motor 142 drives the timing belt 143. The timing belt 143 is supported substantially in parallel with the carriage guide shaft 141, and a portion of the carriage 13 is fixed to the timing belt 143. If the carriage motor 142 is driven based on the command of the control unit 15, the timing belt 143 is driven forward and rearward, and the carriage 13 fixed to the timing belt 143 is guided by the carriage guide shaft 141 so as to reciprocate.

As illustrated in FIG. 2, the control unit 15 is configured to include an I/F 151, a unit control circuit 152, a memory 153, and a central processing unit (CPU) 154.

Through the I/F 151, print data input from the external device 30 is input to the CPU 154.

The unit control circuit 152 includes control circuits for respectively controlling the supply unit 11, the transport unit 12, the carriage movement unit 14, the printing unit 16, and the edge detection sensor 20, and controls an operation of each unit, based on a command signal output from the CPU 154. The control circuit of each unit may be disposed separately from the control unit 15, and may be connected to the control unit 15.

The memory 153 stores various programs or various data items for controlling the operation of the printer 10. For example, the various data items include print profile data for storing the ejection amount of each ink for color data included as print data.

The CPU 154 reads and executes the various programs stored in the memory 153, thereby performing drive control of the supply unit 11, the transport unit 12, and the carriage movement unit 14, and print control of the printing unit 16.

In a case where the edge detection sensor 20 detects the position deviation of the medium M, the CPU 154 issues an alarm to a user as follows. For example, the CPU 154 outputs an error message notifying the user of the position deviation of the medium M and displays the message on the external device 30 (display), or issues an audible alarm sound to the user.

Configuration of Edge Detection Sensor 20

Figure 3:
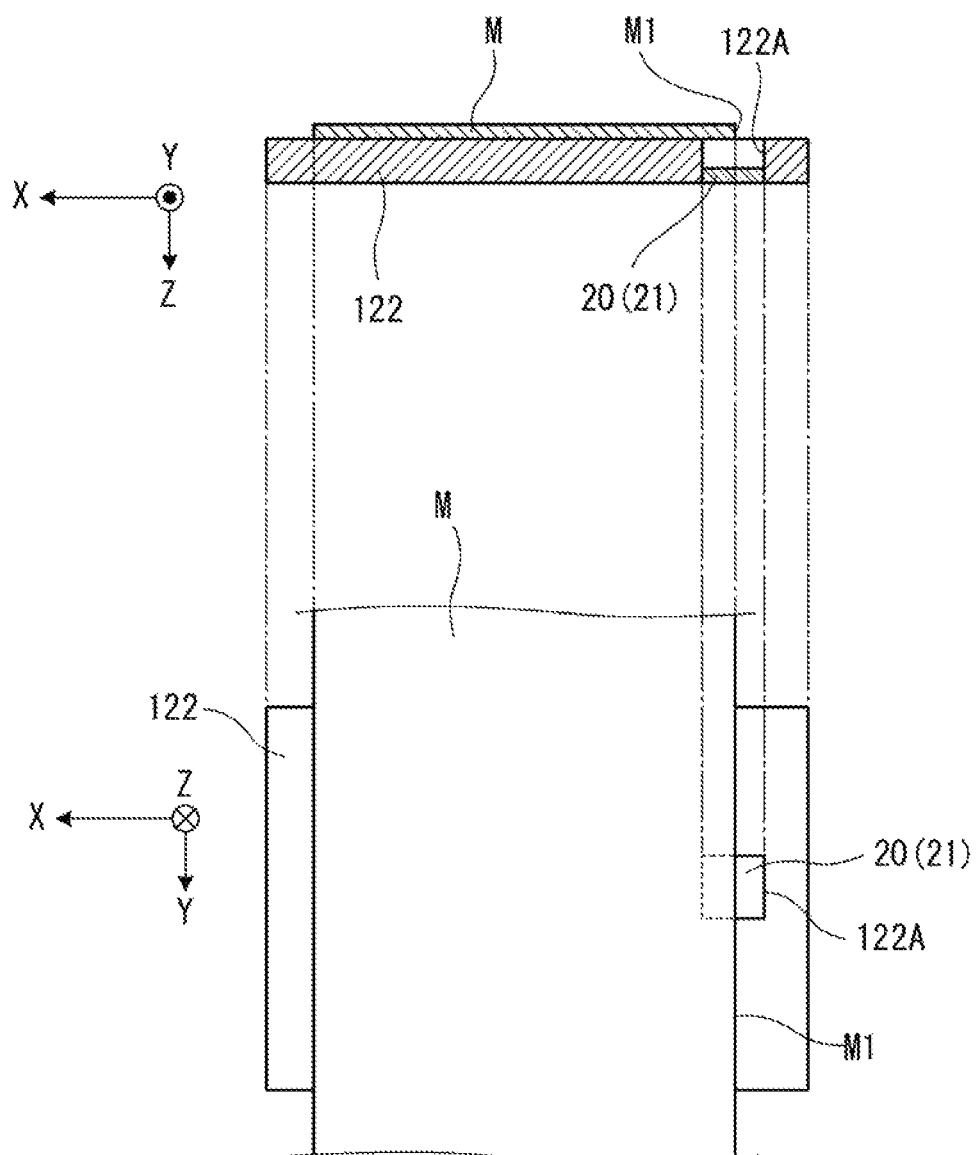
FIG. 3 is a view illustrating a located position of an edge detection sensor according to the present embodiment.

FIG. 3 is a view illustrating a located position of the edge detection sensor according to the present embodiment.

As illustrated in FIG. 3, the platen 122 has a detection hole 122A at a position facing the edge (edge portion M1) along the Y-direction of an end portion on the −X-side of the medium M. The detection hole 122A has the edge detection sensor 20 serving as the ultrasonic device according to the invention. In the present embodiment, an example has been described in which the detection hole 122A and the edge detection sensor 20 are disposed at the position facing the edge portion M1 in the end portion on the −X-side of the medium M. Alternatively, both of these may be disposed at the position facing the edge portion in the end portion on the +X-side of the medium M, may be disposed on both end portions on the ±X-side of the medium M.

Figure 4:
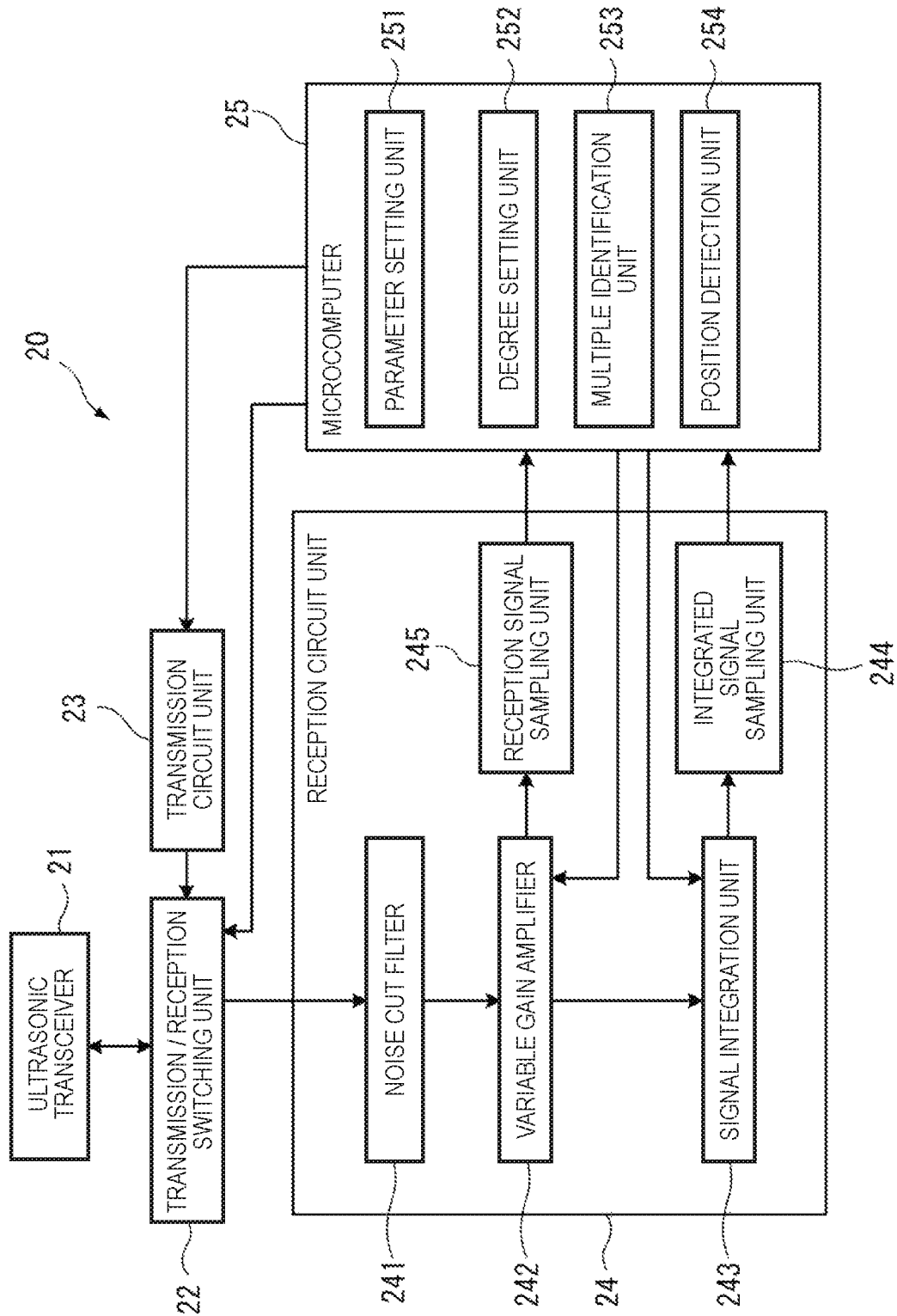
FIG. 4 is a block diagram illustrating a schematic configuration of the edge detection sensor according to the present embodiment.
Figure 5:
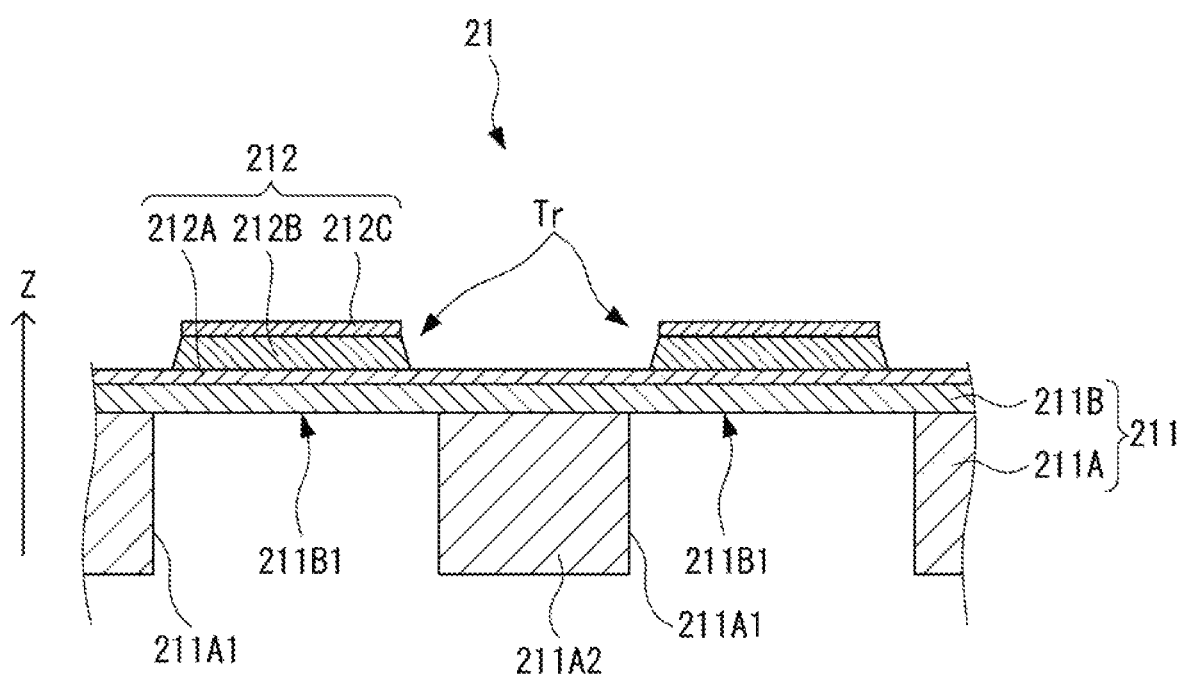
FIG. 5 is a sectional view illustrating a schematic configuration of an ultrasonic transceiver according to the present embodiment.

FIG. 4 is a block diagram illustrating a schematic configuration of the edge detection sensor 20. FIG. 5 is a sectional view illustrating a schematic configuration of an ultrasonic transceiver 21.

As illustrated in FIG. 4, the edge detection sensor 20 according to the present embodiment includes the ultrasonic transceiver 21, a transmission/reception switching unit 22, a transmission circuit unit 23, a reception circuit unit 24, and a microcomputer 25.

The ultrasonic transceiver 21 transmits the ultrasonic wave from the detection hole 122A toward the −Z-side, and receives the ultrasonic wave reflected on the medium M.

As illustrated in FIG. 5, for example, the ultrasonic transceiver 21 is configured to include an element substrate 211 and a piezoelectric element 212.

As illustrated in FIG. 5, the element substrate 211 includes a substrate main body portion 211A and a vibration membrane 211B disposed on one surface side (for example, the +Z-side) of the substrate main body portion 211A.

The substrate main body portion 211A is a substrate for supporting the vibration membrane 211B, and is configured to include a semiconductor substrate made of Si, for example. The substrate main body portion 211A has an opening portion 211A1 penetrating the substrate main body portion 211A along the Z-direction.

The vibration membrane 211B is formed of $SiO_2$, or is configured to include a stacked body formed of $SiO_2$ and $ZrO_2$, for example, the vibration membrane 211B is disposed on the +Z-side of the substrate main body portion 211A. The vibration membrane 211B is supported by a partition wall 211A2 configuring the opening portion 211A1, and closes the +Z-side of the opening portion

211A1. A portion of the vibration membrane 211B which overlaps the opening portion 211A1 when viewed in the Z-direction configures a vibration portion 211B1.

The piezoelectric element 212 is disposed on one surface (for example, a surface on the +Z-side) of the vibration membrane 211B, and at a position overlapping the vibration portion 211B1 (each opening portion 211A1) when viewed in the Z-direction. As illustrated in FIG. 5, the piezoelectric element 212 is configured so that the first electrode 212A, the piezoelectric film 212B, and the second electrode 212C are sequentially stacked on the vibration membrane 211B.

Here, one ultrasonic transducer Tr is configured to include one vibration portion 211B1 and the piezoelectric element 212 disposed on the vibration portion 211B1.

Although not illustrated, the ultrasonic transceiver 21 is configured so that the ultrasonic transducer Tr is located in a two-dimensional array structure, for example.

The ultrasonic transceiver 21 applies a pulse wave voltage having a predetermined frequency between the first electrode 212A and the second electrode 212C of each ultrasonic transducer Tr, thereby causing the piezoelectric film 212B to expand and contract. The vibration portion 211B1 having the piezoelectric element 212 vibrates at a frequency corresponding to an opening width of the opening portion 211A1, and the ultrasonic wave is transmitted from the −Z-side (detection hole 122A side) of the vibration portion 211B1. In the present embodiment, a transmission range in which the ultrasonic wave is transmitted by the ultrasonic transceiver 21 is inside the detection hole 122A in an XY-plane.

If the ultrasonic wave reflected on the medium M is input to the ultrasonic transducer Tr from the detection hole 122A side through the opening portion 211A1, the vibration portion 211B1 vibrates, and a potential difference is generated between the upper portion and the lower portion of the piezoelectric film 212B. In this manner, the reception signal corresponding to the potential difference is output, and the reception signal is detected. Accordingly, the reception of the ultrasonic wave is detected.

The transmission/reception switching unit 22 is connected to each of the ultrasonic transducer Tr, the transmission circuit unit 23, and the reception circuit unit 24 of the ultrasonic transceiver 21. The transmission/reception switching unit 22 is configured to include a switching circuit, and switches the transmission connection for connecting each ultrasonic transducer Tr and the transmission circuit unit 23, and the reception connection for connecting each ultrasonic transducer Tr and the reception circuit unit 24.

The transmission circuit unit 23 is connected to the transmission/reception switching unit 22 and the microcomputer 25. When the transmission/reception switching unit 22 is switched to the transmission connection, based on the control of the microcomputer 25, the transmission circuit unit 23 outputs a drive signal to the ultrasonic transducer Tr, and transmits the ultrasonic wave from the ultrasonic transceiver 21.

The reception circuit unit 24 is connected to the transmission/reception switching unit 22 and the microcomputer 25. When the transmission/reception switching unit 22 is switched to the reception connection, the reception signal transmitted from each ultrasonic transducer Tr is input to the reception circuit unit 24.

The reception circuit unit 24 is configured to include a noise cut filter 241, a variable gain amplifier 242, a signal integration unit 243, an integrated signal sampling unit 244, and a reception signal sampling unit 245.

The noise cut filter 241 removes noise included in the reception signal. For example, it is possible to use a low-pass filter which removes a high frequency component. The noise cut filter 241 may be provided with a low voltage cutting function to cut off a signal having predetermined signal intensity or weaker.

The variable gain amplifier 242 is configured so that the gain can be changed under the control of the microcomputer 25. The reception signal output from the variable gain amplifier 242 is input to the signal integration unit 243 and the microcomputer 25.

The signal integration unit 243 outputs the integrated signal obtained by integrating the reception signals within each predetermined time (predetermined period).

The integrated signal sampling unit 244 samples the integrated signal at a predetermined sampling frequency. The reception signal sampling unit 245 samples the reception signal output from the variable gain amplifier 242 at a predetermined sampling frequency.

The microcomputer 25 (microcontroller) controls the operation of the edge detection sensor 20. The microcomputer 25 reads and executes a program stored in an internal memory, thereby functioning as a parameter setting unit 251, a degree setting unit 252, a multiple identification unit 253, and a position detection unit 254.

The parameter setting unit 251 sets a reference value used for an edge detection process (main measurement) of the medium M which is performed by the edge detection sensor 20 (performing calibration processing).

The degree setting unit 252 sets a degree (first degree) of the reception signal to be integrated by the signal integration unit 243, based on the reception signal when the calibration processing is performed. That is, the signal integration unit 243 integrates the reception signals in such a way that a predetermined period from the transmission timing of the ultrasonic wave until the reception of the reception signal generated by the multiple reflection ultrasonic wave in the first degree is set as an integration time τ. In the present embodiment, as the first degree, the degree setting unit 252 sets a maximum degree N of the reception signal in which the signal intensity of the reception signal is equal to or greater than a first threshold.

Based on the reception signal when the calibration processing is performed, the multiple identification unit 253 calculates a reception cycle by identifying the reception signal when the multiple reflection ultrasonic wave is received.

Based on the signal intensity of the integrated signal in the edge detection process after the calibration processing is performed, the position detection unit 254 detects the position of the medium M, that is, a deviation from the reference position of the medium M is detected.

Ultrasonic Measurement Method

Next, an ultrasonic measurement method of the edge detection sensor 20 in the above-described printer 10 will be described.

Figure 6:
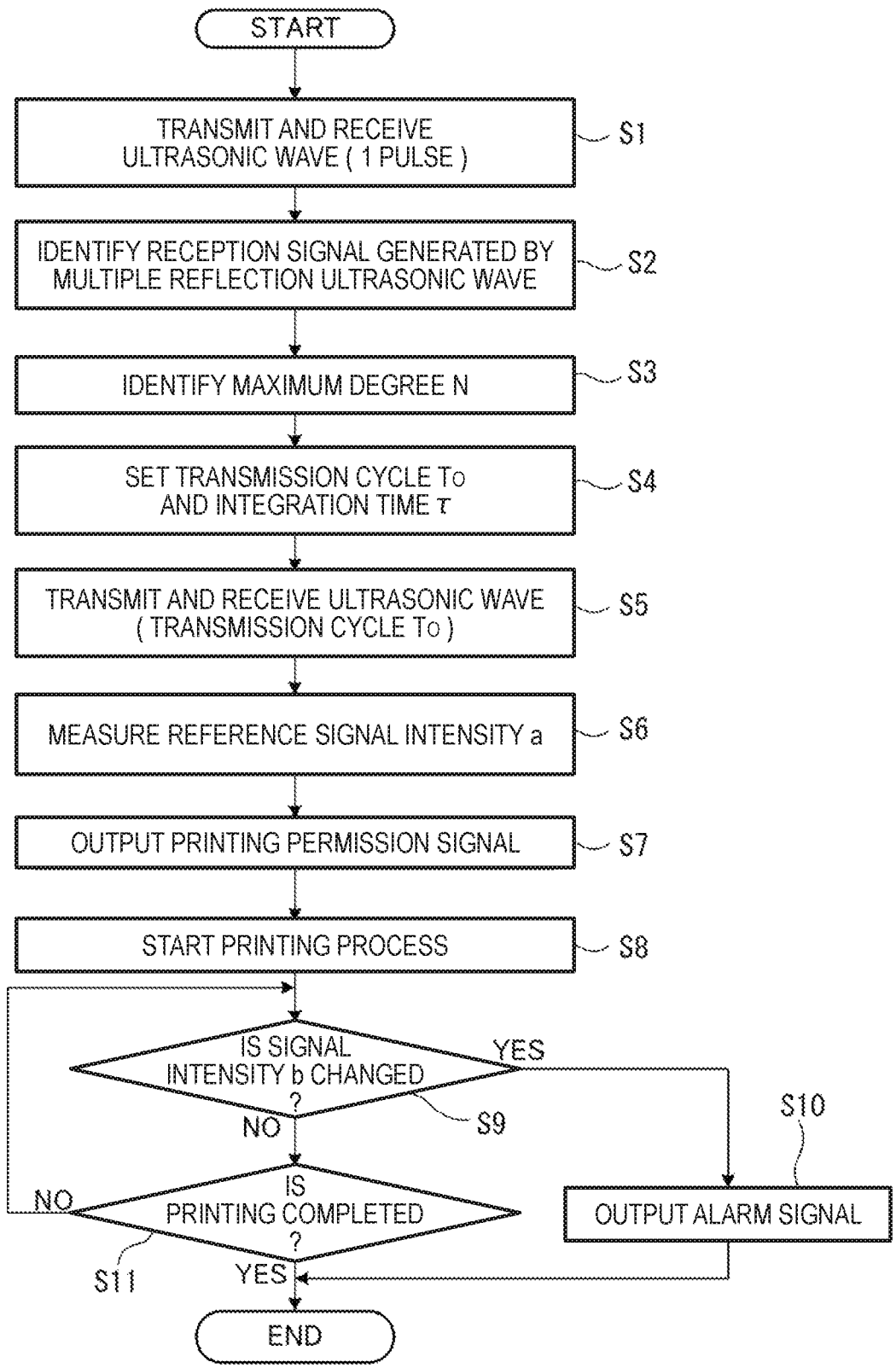
FIG. 6 is a flowchart of calibration processing in an ultrasonic measurement method according to the present embodiment.

FIG. 6 is a flowchart of the ultrasonic measurement method according to the present embodiment.

In the present embodiment, the calibration processing of the edge detection sensor 20 is performed as preprocessing for detecting the position of the medium M.

In the calibration processing, as illustrated in FIG. 3, the medium M is transported, and the position (reference position) of the medium M is set so that the edge portion M1 along the Y-direction of the medium M is located at the center in the X-direction of the detection hole 122A. That is, the medium M is located at the reference position. In this manner, a range of ½ of the transmission range where the ultrasonic wave is transmitted by the ultrasonic transceiver 21, that is, a half of the detection hole 122A is covered with the medium M.

In the calibration processing, the microcomputer 25 first controls the transmission/reception switching unit 22, the transmission circuit unit 23, and the reception circuit unit 24 so as to perform the transmission/reception process of the ultrasonic wave (Step S1).

In Step S1, the parameter setting unit 251 inputs a drive voltage of a single pulse to the ultrasonic transceiver 21, and transmits the ultrasonic wave having a single pulse from each ultrasonic transducer Tr.

Figure 7:
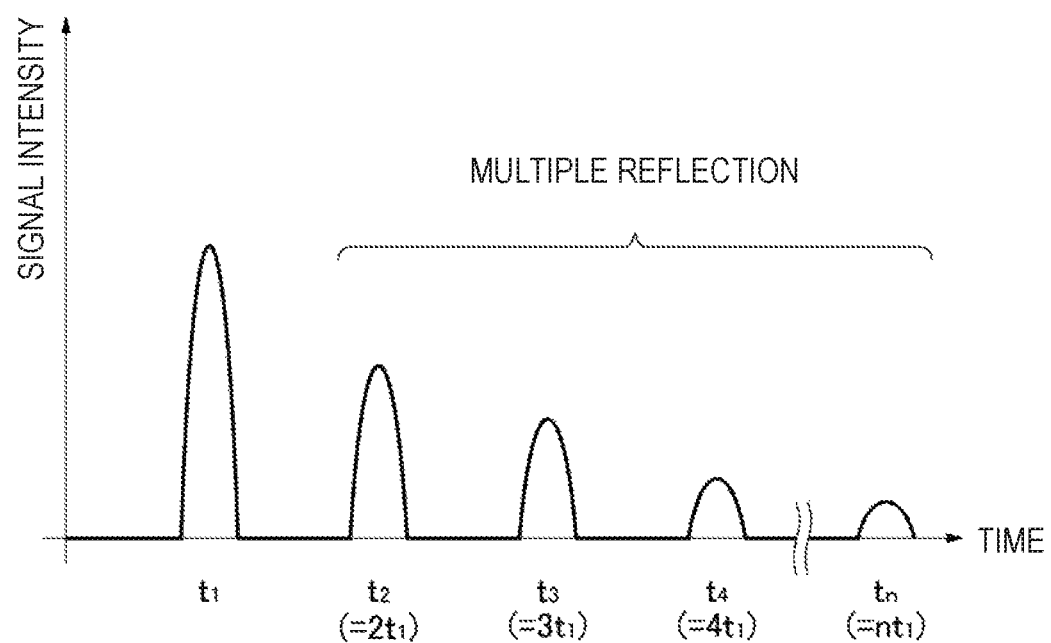
FIG. 7 is a view illustrating an example of a transmission/reception result of an ultrasonic wave in Step S1 in FIG. 6.

FIG. 7 is a view illustrating an example of the transmission/reception results of the ultrasonic wave in Step S1, and illustrates the signal intensity of the reception signal which is changed with the lapse of time.

In Step S1, the reception signal output from the variable gain amplifier 242 is sampled by the reception signal sampling unit 245, and is input to the microcomputer 25.

Here, if the ultrasonic wave is transmitted from the ultrasonic transceiver 21, at the reception timing at which an elapsed time t from the transmission timing of the ultrasonic wave satisfies $t=t_1$, the primary reflection ultrasonic wave reflected on the medium M first time is received by the ultrasonic transceiver 21, and a primary reception signal is output. The ultrasonic wave is reflected multiple times between the ultrasonic transceiver 21 and the medium M. The reception signal is also received when the multiple reflection component is received by the ultrasonic transceiver 21. Here, if the ultrasonic wave reflected on the medium M n-number of times is set as an n-th multiple reflection ultrasonic wave and the reception signal at that time is set as an n-th reception signal, the reception timing of the n-th reception signal is an integral multiple of the time $t_1$ from the ultrasonic wave transmission until the reception timing of the primary reception signal ($t_n=nt_1$). If a distance between the ultrasonic transceiver 21 and the medium M is set as d and sound speed is set as c, $t_n=2nd/c$ is satisfied.

Thereafter, the multiple identification unit 253 identifies the reception signal when the multiple reflection ultrasonic wave is received, based on the reception signal received in Step S1 as illustrated in FIG. 7 (Step S2). A peak position of the reception signal may be obtained as follows. For example, the sampled signal value is differentiated so as to detect the reception timing of the reception signal in which a differential value is "0" and the signal intensity of the reception signal is equal to or greater than a predetermined second threshold. The n-th reception signal generated by the multiple reflection ultrasonic wave is received at a timing of the integral multiple of the time $t_1$ at which the primary reception signal is received. Therefore, at the peak positions obtained as described above, the reception signal in which the time t from the transmission timing until the reception timing increases up to the integral multiple of $t_1$ is identified, thereby identifying the reception signal when the multiple reflection ultrasonic wave is received.

Next, the degree setting unit 252 sets the degree of the reception signal to be integrated by the signal integration unit 243, based on the reception signal received in Step S1 (Step S3). In Step S3, the degree setting unit 252 identifies the reception signal in the maximum degree N in which the signal intensity is equal to or greater than the first threshold in the reception signal as illustrated in FIG. 7, and sets the maximum degree N as the first degree. That is, the maximum degree N in which the signal intensity of the N-th reception signal is equal to or greater than the first threshold and the signal intensity of the reception signal subsequent to the N+1-th reception signal is smaller than the first threshold is set as the first degree.

The degree setting unit 252 adjusts a gain of the variable gain amplifier 242 so as not to receive the reception signal subsequent to the N+1-th reception signal. For example, the gain is lowered so that the signal intensity of the reception signal subsequent to the N+1-th reception signal is equal to or smaller than a predetermined third threshold. In the manner, the signal intensity obtained by the reception signal subsequent to the N+1-th reception signal has a minute value. Therefore, it is possible to suppress an increase in the signal intensity when the reception signal is superimposed on the other reception signal.

The parameter setting unit 251 sets a transmission timing (transmission cycle $T_o$) and the integration time τ of the ultrasonic wave, based on the reception signal obtained in Step S1 (Step S4).

Here, it is preferable that the parameter setting unit 251 sets the transmission cycle $T_o$ of the ultrasonic wave so that a time t2 which is equal to or longer than twice the sampling cycle of the integrated signal sampling unit 244, and during which the secondary multiple reflection ultrasonic wave is received by the ultrasonic transceiver 21 is set as a maximum time. That is, if the transmission cycle $T_o$ of the ultrasonic wave is set to have a value greater than a value of the time t2, the integrated signal does not converge to the constant value. In contrast, since the transmission cycle $T_o$ of the ultrasonic wave is set to be a cycle equal to or shorter than the time t2, the signal intensity of the integrated signal can be stabilized to have the constant value.

The parameter setting unit 251 sets the integration time τ at which the signal integration unit 243 integrates the reception signals. Specifically, τ=2Nd/c is set as the integration time τ. That is, the time $t_n$ from when the ultrasonic wave is transmitted from the ultrasonic transceiver 21 until the N-th multiple reflection ultrasonic wave is received by the ultrasonic transceiver 21 is set as the integration time τ.

After the above-described processes are performed, the microcomputer 25 transmits and receives the ultrasonic wave by using the ultrasonic transceiver 21, based on the set parameter (Step S5). In Step S5, the microcomputer 25 transmits the ultrasonic wave from the ultrasonic transceiver 21 in the transmission cycle $T_o$ set in Step S4.

Figure 8:
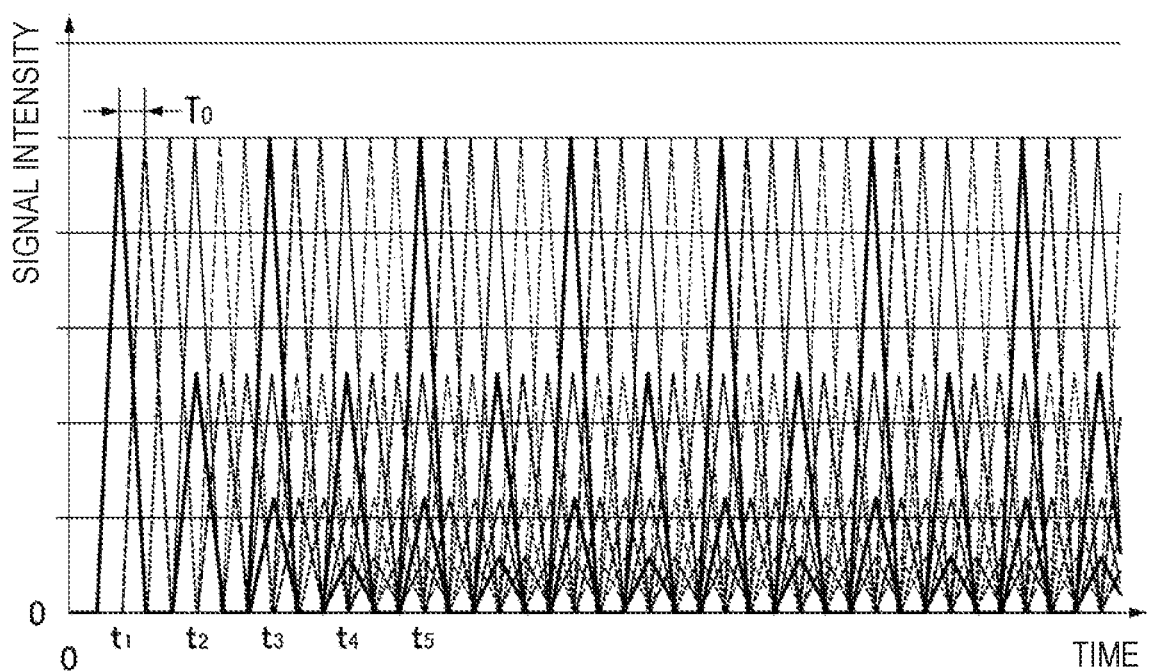
FIG. 8 is a view illustrating an example of a waveform of a reception signal when the ultrasonic wave is transmitted in a transmission cycle $T_o$, and when the ultrasonic wave is received by the ultrasonic transceiver alone at each ultrasonic wave transmission timing.

FIG. 8 is a view illustrating an example of a waveform of the reception signal when the ultrasonic wave is transmitted in the transmission cycle $T_o$ when the ultrasonic wave is received by the ultrasonic transceiver 21 alone at each ultrasonic wave transmission timing. FIG. 8 illustrates signal components at each ultrasonic wave transmission timing which is included in the reception signal, and in actual, a signal to which the signal components are added is output.

As illustrated in FIG. 8, if the ultrasonic wave is transmitted in the transmission cycle $T_o$, the primary reception signal to the N-th reception signal of the ultrasonic wave transmitted at each ultrasonic wave transmission timing are superimposed one on another.

Figure 9:
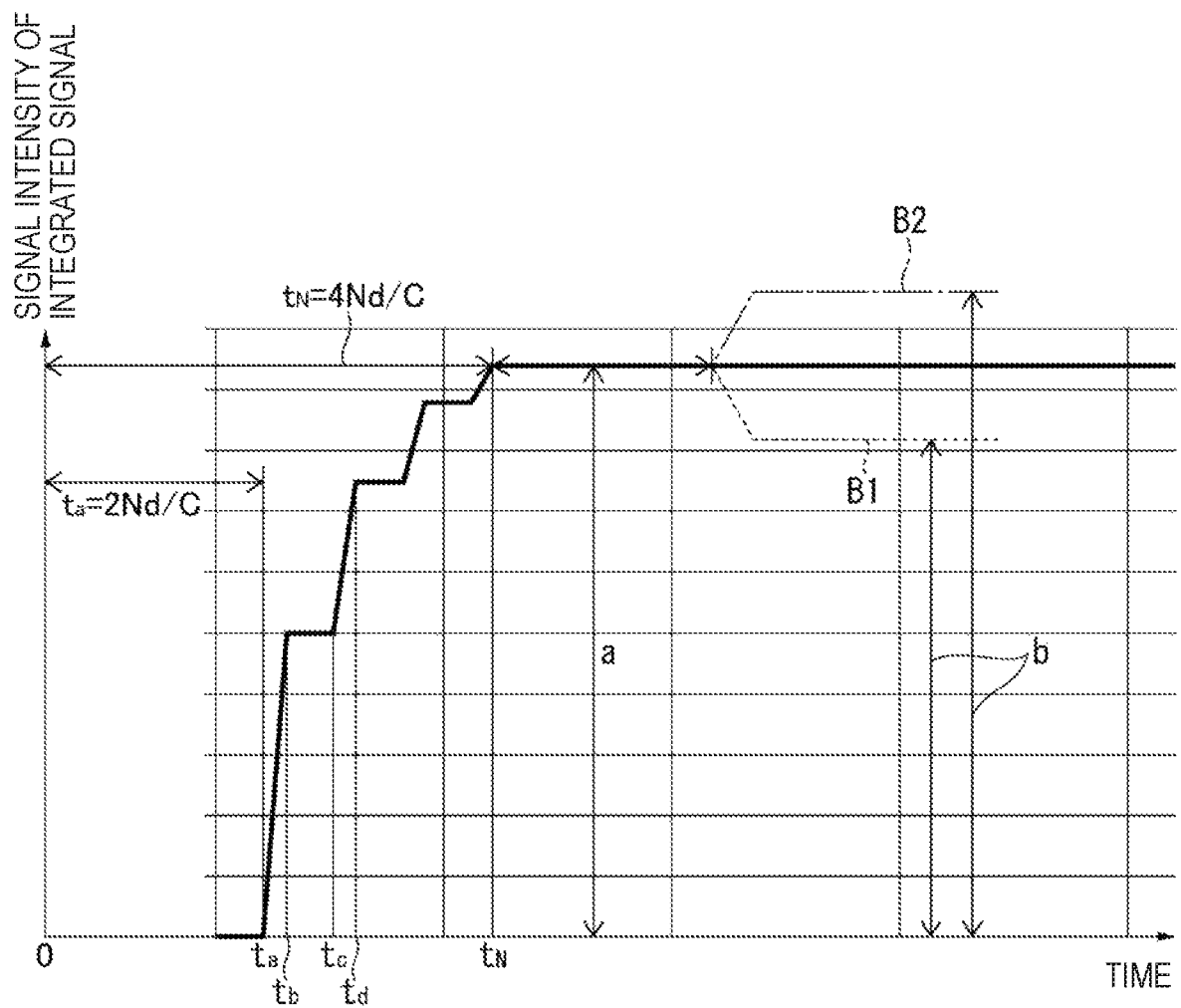
FIG. 9 is a view illustrating an example of a change in signal intensity of an integrated signal.

FIG. 9 is a view illustrating an example of a change in the signal intensity of the integrated signal.

If the reception signals output during the integration time τ are integrated by the signal integration unit 243, the signal intensity of that integrated signal is changed as illustrated in FIG. 9.

In FIG. 9, the timing at which Step S5 starts is set to t=0. The signal integration unit 243 integrates the reception signals output during the integration time τ=2Nd/c. Accordingly, the integrated signal is output from the timing at which the elapsed time t satisfies t=$t_a$ (=2Nd/c). During a period while the elapsed time t satisfies t=ta to the time t=tb, the integrated value increases since the secondary reception signal of the ultrasonic wave transmitted by the transmission cycle $T_o$ is sequentially added thereto. During a period while the elapsed time t satisfies t=tb to t=tc, the integrated value is a constant value obtained by integrating the primary reception signal and the secondary reception signal which are generated using each ultrasonic wave transmitted in the transmission cycle $T_o$. During a period while the elapsed time t satisfies t=tc to t=td, the integrated value increases since the third reception signal generated by each ultrasonic wave transmitted in the transmission cycle $T_o$ is added thereto. Thereafter, with the lapse of time, the signal intensity of the integrated signal repeatedly increases, and the constant value is repeatedly maintained. When the signal intensity of the integrated signal has the constant value at the N-th number of times (including a portion where the signal intensity has a constant value "0" during a period of t=0 to t=ta), the integrated signal has the reference signal intensity a. As illustrated in FIG. 9, the timing at which the reference signal intensity a is subsequent to the timing at which the elapsed time t satisfies t=4Nd/c. The example illustrated in FIG. 9 is an example in which N=5 is satisfied.

After Step S5, the parameter setting unit 251 measures the signal intensity (reference signal intensity a) of the integrated signal when the signal intensity of the n-th integrated signal output from the signal integration unit 243 has the constant value (Step S6).

In Step S6, a reception timing $t_n$ for receiving the multiple reflection ultrasonic wave may be detected and compared with the reception timing of the reception signal identified in Step S2 so as to determine whether or not both of these coincident with each other. In a case where it is determined that both of these do not coincide with each other, the process returns to Step S1, and the calibration processing is performed again.

Thereafter, the microcomputer 25 continuously performs the edge detection process.

That is, the microcomputer 25 outputs a printing permission signal to the control unit 15 so as to indicate that the calibration processing is completed and the edge detection process is completely prepared in the edge detection sensor 20 (Step S7).

In this manner, the control unit 15 controls the supply unit 11, the transport unit 12, the carriage movement unit 14, and the printing unit 16 so that the medium M is transported in the Y-direction and the printing unit 16 starts the printing (Step S8).

The position detection unit 254 monitors a signal intensity b of the integrated signal output from the signal integration unit 243, and determines whether or not the signal intensity b is changed (Step S9).

Figure 10:
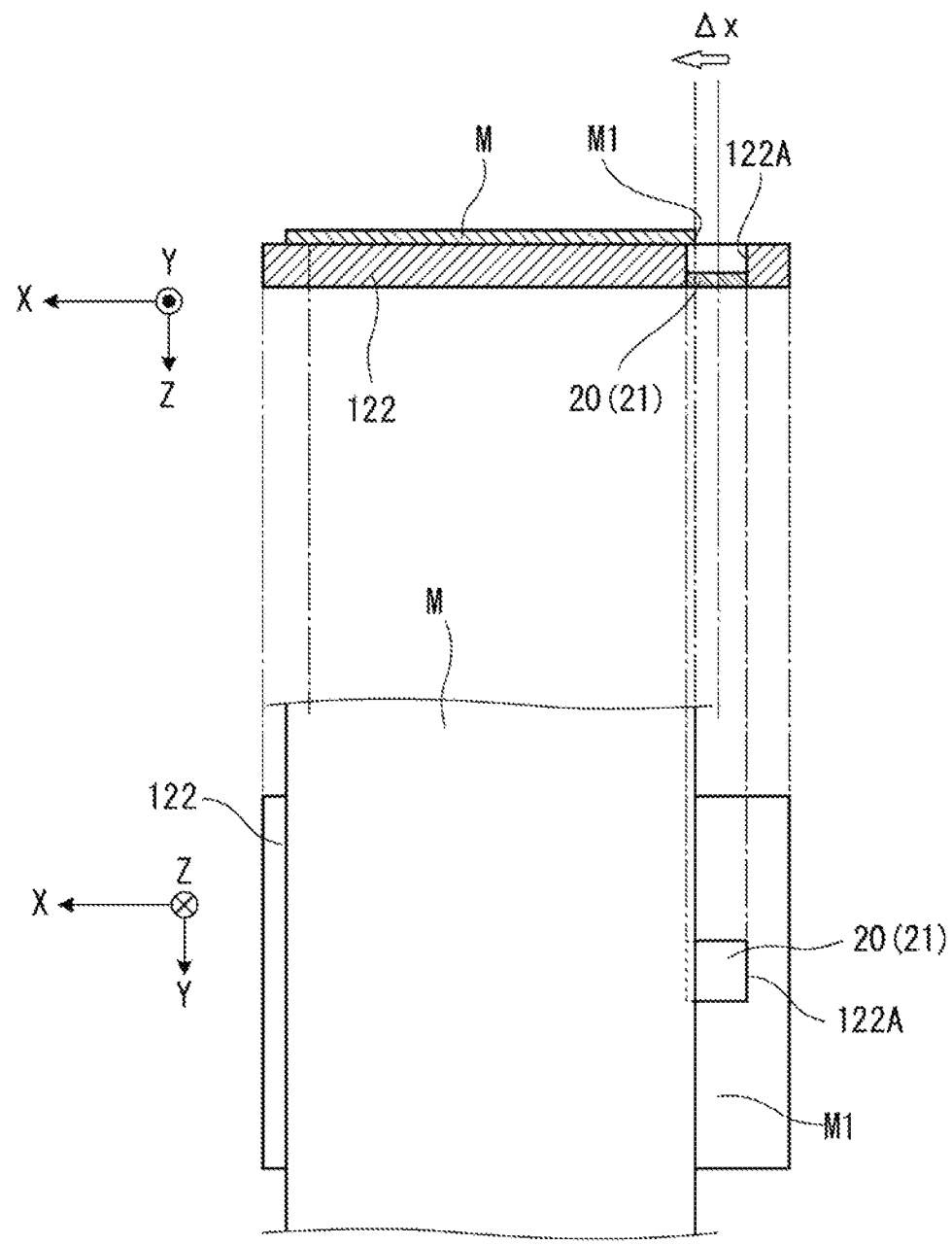
FIG. 10 is a view illustrating a position of a medium relative to a detection hole when the medium moves to a +X-side as much as $\Delta x$.
Figure 11:
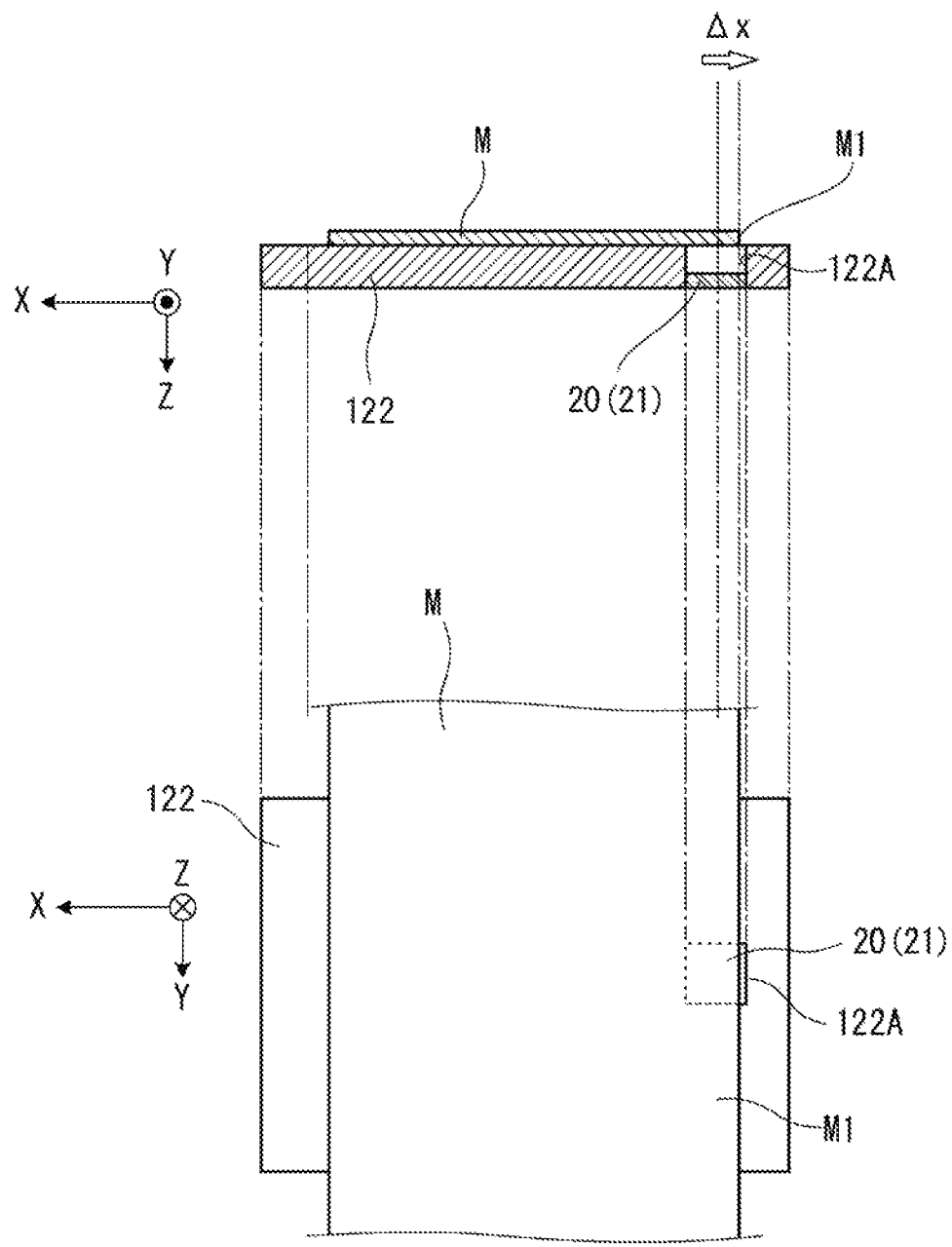
FIG. 11 is a view illustrating a position of the medium relative to the detection hole when the medium moves to a −X-side as much as $\Delta x$.
Figure 12:
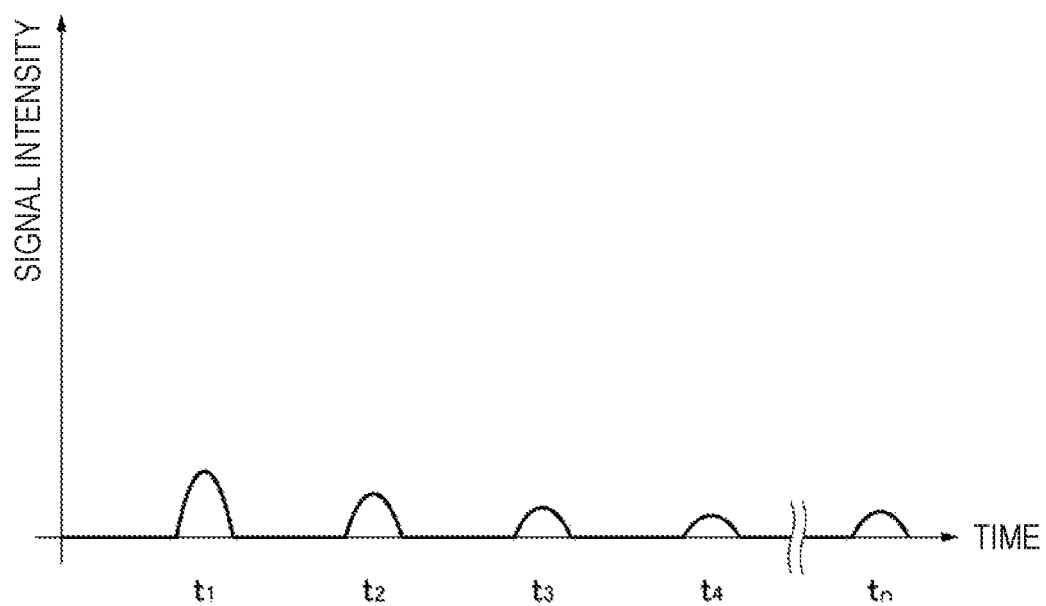
FIG. 12 is a view illustrating a waveform of a reception signal generated by the ultrasonic wave transmitted when the medium moves to the position illustrated in FIG. 10.
Figure 13:
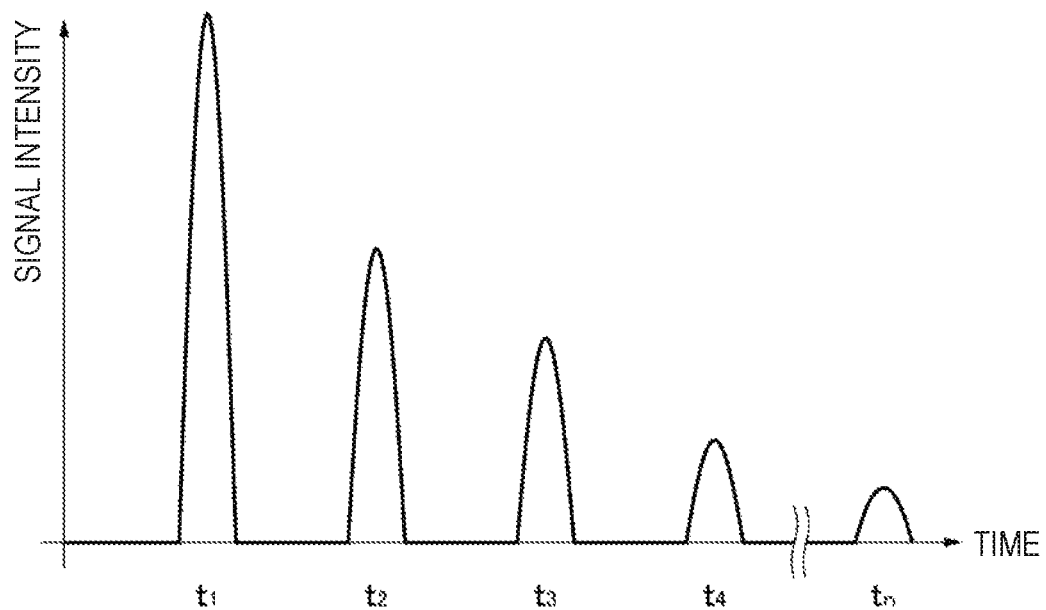
FIG. 13 is a view illustrating a waveform of the reception signal generated by the ultrasonic wave transmitted when the medium moves to the position illustrated in FIG. 11.

FIG. 10 is a view illustrating a position of the medium M relative to the detection hole 122A when the medium M moves to the +X-side as much as Δx. FIG. 11 is a view illustrating a position of the medium M relative to the detection hole 122A when the medium M moves to the −X-side as much as Δx. FIG. 12 is a view illustrating a waveform of the reception signal generated by the ultrasonic wave transmitted when the medium M moves to the position illustrated in FIG. 10. FIG. 13 is a view illustrating a waveform of the reception signal generated by the ultrasonic wave transmitted when the medium M moves to the position illustrated in FIG. 11.

As illustrated in FIG. 10, if the medium M moves to the +X-side, an area of the medium M overlapping the detection hole 122A (area of the medium M overlapping the transmission range of the ultrasonic wave) decreases. Therefore, the ultrasonic wave reflected on the medium M decreases, and the signal intensity of the reception signal decreases as illustrated in FIG. 12. In this case, as illustrated by a line B1 in FIG. 9, the signal intensity b of the integrated signal also decreases, and b<a is satisfied.

On the other hand, as illustrated in FIG. 11, if the medium M moves to the −X-side, the area of the medium M overlapping the detection hole 122A (area of the medium M overlapping the transmission range of the ultrasonic wave) increases. Therefore, the ultrasonic wave reflected on the medium M increases, and the signal intensity of the reception signal increases as illustrated in FIG. 13. In this case, as illustrated by a line B2 in FIG. 9, the signal intensity b of the integrated signal also increases, and b>a is satisfied.

Therefore, in Step S9, the position detection unit 254 compares the signal intensity b of the integrated signal with the reference signal intensity a, and determines whether or not a magnitude relationship therebetween is changed as much as a predetermined value or more, based on the magnitude relationship therebetween. In this case, it is preferable that the position detection unit 254 further determines whether the signal intensity b increases or decreases compared to the reference signal intensity a.

In a case where it is determined as Yes in Step S9, the edge detection sensor 20 outputs an alarm signal to the control unit 15 (Step S10). In this manner, the control unit 15 controls the supply unit 11, the transport unit 12, the carriage movement unit 14, and the printing unit 16 so as to stop the printing process, and outputs an alarm for notifying a user of the position deviation of the medium M. For example, an error message for notifying the position deviation is displayed on a display connected to the printer 10, an alarm lamp (not illustrated) disposed in the printer 10 is turned on, or an alarm sound is output. In the present embodiment, it is possible to determine whether the medium M is moved to the +X-side or moved to the −X-side depending on an increase/decrease direction of the signal intensity. Based on an increase/decrease amount of the signal intensity, the movement amount can also be detected. Therefore, as an error message, the movement direction and the movement amount of the medium M may be notified in conjunction with each other.

On the other hand, in a case where it is determined as No in Step S9, the microcomputer 25 determines whether or not the signal for notifying the completion of the printing process is received from the control unit 15 (Step S11). If it is determined as Yes in Step S11, the microcomputer 25 stops transmitting the ultrasonic wave, and completes the edge detection process. In a case where it is determined as No in Step S11, the process returns to Step S9. For example, the edge detection process is continuously performed by the edge detection sensor 20 until the printing process is completed.

Operation Effect of Present Embodiment

According to the present embodiment, the edge detection sensor 20 (ultrasonic device) includes the ultrasonic transceiver 21 that transmits the ultrasonic wave to the medium M (target) in the transmission cycle $T_o$ (predetermined interval), and that receives the ultrasonic wave reflected on the medium M so as to output the reception signal. In addition, the microcomputer 25 of the edge detection sensor 20 functions as the signal integration unit 243 which outputs the integrated signal obtained by integrating the reception signals output within the integration time τ (predetermined period), and the position detection unit 254 which detects the position of the medium M, based on the magnitude relationship between the signal intensity b of the integrated signal and the reference signal intensity a (predetermined reference value).

If the position of the medium M is not changed, the signal intensity of the integrated signal has the constant value. Therefore, the edge detection sensor 20 according to the present embodiment can more accurately detect the position of the medium M, compared to a case where the position of the medium M is detected using only the signal intensity of the reception signal.

Even according to a configuration of detecting the position of the medium M using only the reception signal, the transmission timing of the ultrasonic wave is shifted. In this manner, a countermeasure can be prepared so as not to overlap the reception timing of the multiple reflection ultrasonic wave. However, in this case, it is necessary to set the transmission timing of the ultrasonic wave after the timing at which the signal intensity of the reception signal generated by the multiple reflection ultrasonic wave is no longer detected. Consequently, the transmission control of the ultrasonic wave becomes complicated, and furthermore, the ultrasonic wave cannot be continuously transmitted. If the transmission timing of the ultrasonic wave is delayed against the continuously transmitted medium M, the measurement position for detecting the edge of the medium M is separated in the Y-direction as much as (transport speed of the medium M)×(transmission cycle of the ultrasonic wave). Accordingly, the position cannot be accurately detected. Alternatively, it is necessary to alternately perform the edge detection process and the transport of the medium M by transmitting and receiving the ultrasonic wave. Consequently, processing speed of not only the edge detection process but also the printing process of the printer 10 is lowered.

In contrast, according to the present embodiment, it is not necessary to shift the transmission timing of the ultrasonic wave from the reception timing of the multiple reflection ultrasonic wave. Accordingly, the control of the transmission timing of the ultrasonic wave is facilitated. In addition, the ultrasonic wave can be transmitted in a short cycle. Therefore, it is possible to more accurately detect the position of the continuously transported medium M. Furthermore, the edge detection process can be performed by the edge detection sensor 20 simultaneously with the transport of the medium M. Therefore, the edge detection process and the printing process can be performed using faster processing speed.

The edge detection sensor 20 according to the present embodiment includes the multiple identification unit 253 which identifies the reception signal generated by the multiple reflection ultrasonic wave reflected multiple times between the medium M and the ultrasonic transceiver 21. The signal integration unit 243 integrates the reception signals output during the time (integration time τ) until the multiple reflection ultrasonic wave in the maximum degree N is received by the ultrasonic transceiver 21 after the ultrasonic wave is transmitted.

Specifically, the degree setting unit 252 detects the maximum degree N in which the N-th reception signal is equal to or greater than the first threshold and the N+1-th reception signal is smaller than the first threshold, and adjusts the gain of the variable gain amplifier 242 so that the signal intensity of the N+1-th reception signal is equal to or smaller than the second threshold.

In this manner, the signal integration unit 243 outputs the integrated signal until the multiple reflection ultrasonic wave up to the maximum degree N is received, that is, the integrated signal obtained by receiving the reception signals of the primary reception signal to the N-th reception signal. In this way, the degree of the reception signals to be integrated is fixed. Accordingly, the reception signal subsequent to the N+1-th reception signal is not superimposed on the integrated signal output in a case where the position of the medium M is not changed. Therefore, the signal intensity b has the constant value, and the accuracy in detecting the position of the medium M can be improved.

The reception circuit unit 24 includes the noise cut filter 241. The gain can be adjusted using the above-described variable gain amplifier 242, and the noise components such as near-field distance noise and spark noise can be removed by the noise cut filter 241. Therefore, it is possible to effectively prevent the signal intensity b of the integrated signal from being changed in a case where the position of the medium M is not changed, and the detection accuracy of the position of the medium M can be improved.

The edge detection sensor 20 according to the present embodiment includes the degree setting unit 252 which sets the maximum degree N as the first degree by detecting the maximum degree N in which the signal intensity of the reception signal generated by receiving the multiple reflection ultrasonic wave is equal to or greater than the first threshold, when the ultrasonic wave having a single pulse is transmitted to the medium M.

In this case, the signal intensity of the reception signal generated by the multiple reflection ultrasonic wave subsequent to the N+1-th reception signal decreases to be smaller than the first threshold. Therefore, the reception signal can be easily removed through the gain adjustment performed by the variable gain amplifier 242.

In the edge detection sensor 20 according to the present embodiment, the transmission cycle $T_o$ (interval) of the ultrasonic wave transmitted by the ultrasonic transceiver 21 is shorter than the time t2 required until the reception signal (secondary reception signal) of the secondary multiple reflection ultrasonic wave is received after the ultrasonic wave is transmitted from the ultrasonic transceiver 21.

If the transmission cycle $T_o$ (interval) of the ultrasonic wave is later than the reception timing of the secondary reception signal, the signal intensity b of the integrated signal is cyclically changed in the case where the position of the medium M is not changed, and the reference signal intensity a (reference value) is also cyclically changed. In contrast, as described above, the transmission cycle $T_o$ is set as $T_o \le t_2$. In this manner, after the timing at which the elapsed time t from the transmission timing of the ultrasonic wave satisfies t=4Nd/c, the signal intensity of the integrated signal has the constant value. Accordingly, the position detection unit 254 can accurately detect the position of the medium M by performing a simple process of comparing the reference signal intensity a with the signal intensity b of the integrated signal output from the signal integration unit 243.

In the present embodiment, the position where the medium M covers the half of the detection hole 122A, that is, the position for covering ½ of the transmission range where the ultrasonic wave is transmitted is set as the reference position. The signal intensity of the integrated signal when the medium M is located at the reference position is set as the reference signal intensity a.

In this manner, the detection range detectable by the edge detection sensor 20 when the medium M moves to the +X-side and the detection range detectable by the edge detection sensor 20 when the medium M moves to the −X-side can be the same as each other.

Modification Example

The invention is not limited to the above-described embodiment. Modifications and improvements are included in the invention within the scope where the invention can be achieved.

For example, in the above-described embodiment, the ultrasonic transducer Tr which performs both the transmission and the reception of the ultrasonic wave is used so that the transmission/reception switching unit 22 switches between the transmission connection and the reception connection. In this manner, the transmission/reception process of the ultrasonic wave is performed. In contrast, the ultrasonic transceiver 21 may be configured to include the ultrasonic transducer Tr for transmitting the ultrasonic wave and the ultrasonic transducer Tr for receiving the ultrasonic wave. In this case, it is possible to prevent the spark noise from being generated when the transmission and the reception of the ultrasonic wave are switched therebetween.

In the above-described embodiment, the ultrasonic transceiver is located on one side (the +Z-side) with respect to the target (medium M). However, the invention is not limited thereto. For example, as the ultrasonic transceiver 21, a configuration may be adopted as follows. The transmission unit for transmitting the ultrasonic wave and the reception unit for receiving the ultrasonic wave are separated from each other so as to interpose the target therebetween.

Figure 14:
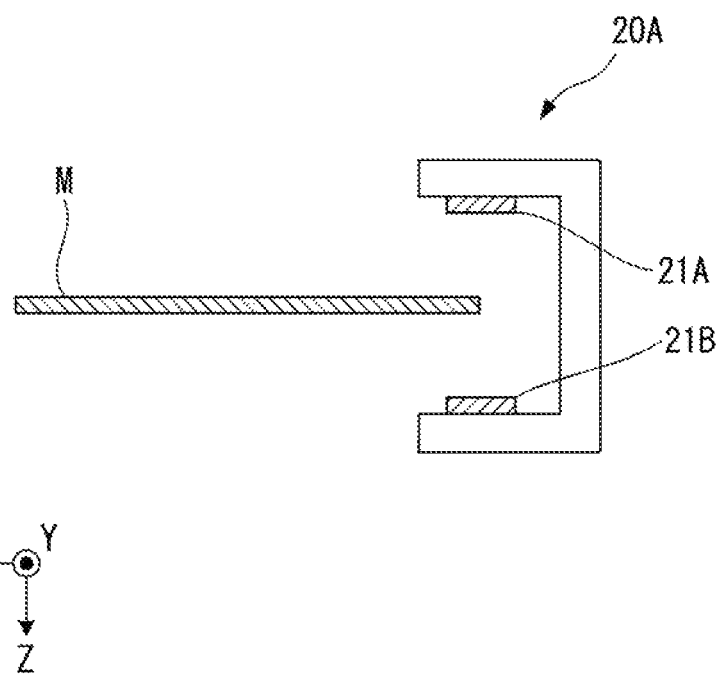
FIG. 14 is a schematic view illustrating another example of the edge detection sensor.

FIG. 14 is a schematic view illustrating another example of an edge detection sensor.

As illustrated in FIG. 14, in an edge detection sensor 20A (ultrasonic device) according to the present example, the ultrasonic transceiver is configured to include a transmission unit 21A for transmitting the ultrasonic wave, and a reception unit 21B for receiving the ultrasonic wave. The transmission unit 21A is located on one side (for example, the −Z-side) of the medium M (target), and the reception unit 21B is located on the other side (for example, the +Z-side) of the medium M. The medium M is located between the transmission unit 21A and the reception unit 21B.

In the edge detection sensor 20A configured in this way, the ultrasonic wave received by the reception unit 21B includes a first ultrasonic wave component reflected multiple times between the transmission unit 21A and the reception unit 21B, a second ultrasonic wave component reflected multiple times between the transmission unit 21A and the medium M, and a third ultrasonic wave component reflected multiple times between the reception unit 21B and the medium M.

In this case, the first ultrasonic wave component is received by the reception unit 21B, and the reception signal is output at a timing in which a distance from the transmission unit 21A to the reception unit 21B is set as dab, the number of reflected multiple times is set as $n_{ab}$ number of times, and an elapsed time from the transmission timing of the ultrasonic wave satisfies $t=t_{ab}=(d_{ab}+2d_{ab} \times n_{ab})/c$. The second ultrasonic wave component is received by the reception unit 21B, and the reception signal is output at a timing in which a distance from the transmission unit 21A to the medium M is set as $d_{aM}$, the number of reflected multiple times is set as $n_{aM}$ number of times, and an elapsed time from the transmission timing of the ultrasonic wave satisfies $t=t_{aM}=(d_{ab}+2d_{aM} \times n_{aM})/c$. The third ultrasonic wave component is received by the reception unit 21B, and the reception signal is output at a timing in which a distance from the medium M to the reception unit 21B is set as $d_{bM}$, the number of reflected multiple times is set as $n_{bM}$ number of times, and an elapsed time from the transmission timing of the ultrasonic wave satisfies $t=t_{bM}=(d_{ab}+2d_{bM} \times n_{bM})/c$.

The ultrasonic wave also includes the ultrasonic wave component in which the multiple reflected position is changed. For example, the ultrasonic wave includes the ultrasonic wave component reflected multiple times between the transmission unit 21A and the medium M and between the medium M and the reception unit 21B after being reflected multiple times between the transmission unit 21A and the reception unit 21B. In this case, the numbers of reflected multiple times $n_{ab}$, $n_{aM}$, and $n_{bM}$ are also changed, and the reception timing or the signal intensity of the reception signal is also changed. That is, the reception signals are output as many as the number of combinations thereof at different reception timings.

Here, the position of the reception timing caused by the multiple reflection can be derived from a combination of the ultrasonic waves to be reflected multiple times. However, even if the reception signal caused by the multiple reflection can be identified, it is difficult to detect the position of the medium M by using only the signal intensity.

In contrast, similar to the above-described embodiment, the signal intensity of the integrated signal when the medium M is located at the reference position is set as the reference signal intensity a so as to monitor a change in the integrated signal. In this manner, the position of the medium M can be more accurately detected. That is, the integrated signal obtained by integrating the reception signals output during the integration time τ is less likely to be affected by the above-described multiple reflection component. In a case where the position of the medium M is not moved, the signal intensity of the integrated signal has the constant value or substantially the constant value. Therefore, the signal intensity of the integrated signal is monitored so as to determine whether or not the signal intensity of the integrated signal is changed. In this manner, it is possible to easily and accurately detect the position deviation of the medium M.

In the above-described embodiment, the time $t_n$ required until the N-th reception signal is obtained from the transmission timing of the ultrasonic wave by detecting the maximum degree N where the signal intensity of the reception signal is equal to or greater than the first threshold is set as the integration time τ. However, the invention is not limited thereto. That is, the integration time τ may be a time required until the reception signal in the preset first degree $n_c$ is obtained from the transmission timing of the ultrasonic wave. In this case, the signal intensity of the reception signal in the first degree $n_c$ may be smaller than the first threshold. In this case, although the integration time τ is lengthened, the detection accuracy can be improved. Alternatively, the $n_c+1$-th reception signal may be equal to or greater than the first threshold.

In the above-described embodiment, the transmission cycle $T_o$ of the ultrasonic wave transmitted by the ultrasonic transceiver 21 is set to the time t2 required until the reception timing of the reception signal generated by the secondary multiple reflection ultrasonic wave from the transmission timing of the ultrasonic wave. However, the invention is not limited thereto. For example, the transmission cycle $T_o$ (interval) of the ultrasonic wave may be later than the reception timing of the secondary reception signal. In this case, the signal intensity b of the integrated signal is cyclically changed in a case where the reference signal intensity a and the position of the medium M are not changed. Accordingly, the position detection unit detects the position of the medium M by determining whether the signal intensity b which is cyclically changed in response to the elapsed time t from the transmission timing of the ultrasonic wave is the same as the reference signal intensity a which is cyclically changed.

In the above-described embodiment, the signal value of the integrated signal when the edge of the medium M is located at the center of the detection hole 122A and the medium M is located at the position for covering the half of the detection hole 122A, that is, ½ of the transmission range of the ultrasonic wave is set as the reference signal intensity a. However, the invention is not limited thereto.

For example, in a case where the end portion on the −X-side of the medium M is held by a guide or the like and is moved only to the +X-side, the position where the medium M covers the detection hole 122A may be the reference position so as to set the reference value (reference signal intensity). In a case where the medium M is moved only to the −X-side, the end portion on the −X-side of the medium M may be aligned with the +X-side of the detection hole 122A. In this manner, the position where the medium M does not overlap the detection hole 122A may be set as the reference position. That is, the reference position may be set in accordance with the movement amount in a case where the medium M is moved (in a case of deviation), and the reference reception signal (reference value) may be set corresponding to the reference position.

In the above-described embodiment, an example has been described in which the edge detection sensor 20 detects the edge portion M1 on the −X-side of the medium M transported in the Y-direction in the printer 10. However, the invention is not limited thereto. The ultrasonic device and the ultrasonic measurement method according to the invention can be used for various purposes of detecting the movement or the position of the target. For example, when a workpiece is moved to a predetermined position so as to be processed in a manufacturing apparatus of a factory, the invention can be used as the ultrasonic device for determining whether or not the workpiece is moved to the predetermined position.

Alternatively, a specific structure when the invention is embodied can be appropriately changed to other structures within the scope where the invention can be achieved.

The entire disclosure of Japanese Patent Application No. 2017-250709 filed Dec. 27, 2017 is expressly incorporated herein by reference.

What is claimed is:

1. An ultrasonic device comprising:
   an ultrasonic transceiver configured to transmit a plurality of ultrasonic waves to a target at a predetermined interval between two adjacent waves of the plurality of ultrasonic waves and receive a plurality of reflection ultrasonic waves that are reflected by the target a plurality of times so as to output a plurality of reception signals with respect to every wave of the plurality of ultrasonic waves;
   a memory configured to store a program; and
   a processor configured to execute the program so as to:
      perform a calibration process in which a single test pulse of the plurality of ultrasonic waves is transmitted toward a test target located at a reference position and receive a plurality of test reception signals corresponding to a plurality of test reflection ultrasonic waves from the test target so as to determine a reference degree by comparing each of the plurality of test reception signals with a first threshold, wherein the reference degree corresponding to a reference number of the plurality of test reception signals;
      cause the ultrasonic transceiver to transmit the plurality of ultrasonic waves toward the target located at an actual operation position;
      receive the reference number of the plurality of reflection ultrasonic waves from the target and obtain the reference number of the plurality of reception signals with respect to every wave of the plurality of ultrasonic waves;
      integrate the reference number of the plurality of reception signals to generate an integrated signal; and
      detect a position of the target based on a magnitude relationship between signal intensity of the integrated signal and a predetermined reference value,
   wherein the two adjacent waves of the plurality of ultrasonic waves are a first wave and a second wave, and
   the predetermined interval between the first wave and the second wave transmitted by the ultrasonic transceiver is shorter than a time required until the reception signal of a secondary multiple reflection ultrasonic wave is received after the first wave is transmitted from the ultrasonic transceiver.

2. The ultrasonic device according to claim 1,
   wherein the processor is configured to determine a maximum degree in which a degree of signal intensity of each of the plurality of test reception signals that is equal to or larger than the first threshold is maximum, and the processor is configured to set the maximum degree as the reference degree.

3. The ultrasonic device according to claim 1,
   wherein the predetermined reference value represents the signal intensity of the integrated signal when the target is located while covering ½ of a transmission range of the ultrasonic transceiver in which the plurality of ultrasonic waves are transmitted by the ultrasonic transceiver.

4. An ultrasonic measurement method for causing a processor to execute a program stored in a memory and detect a position of a target by using an ultrasonic device including an ultrasonic transceiver that transmits a plurality of ultrasonic waves to the target at a predetermined interval between two adjacent waves of the plurality of ultrasonic waves, and that receives a plurality of reflection ultrasonic waves that are reflected by the target so as to output a plurality of reception signals with respect to every wave of the plurality of ultrasonic waves, the method comprising executing on the processor the steps of:
   performing a calibration process in which a single test pulse of the plurality of ultrasonic waves is transmitted toward a test target located at a reference position and receive a plurality of test reception signals corresponding to a plurality of test reflection ultrasonic waves from the test target so as to determine a reference degree by comparing each of the plurality of test reception signals with a first threshold, wherein the reference degree corresponding to a reference number of the plurality of test reception signals;
   causing the ultrasonic transceiver to transmit the plurality of ultrasonic waves toward the target located at an actual operation position;
   receiving the reference number of the plurality of reflection ultrasonic waves from the target and obtaining the reference number of the plurality of reception signals with respect to every wave of the plurality of ultrasonic waves;
   integrating the reference number of the plurality of reception signals to generate an integrated signal; and detecting a position of the target based on a magnitude relationship between signal intensity of the integrated signal and a predetermined reference value,
wherein the two adjacent waves of the plurality of ultrasonic waves are a first wave and a second wave, and
the predetermined interval between the first wave and the second wave transmitted by the ultrasonic transceiver is shorter than a time required until the reception signal of a secondary multiple reflection ultrasonic wave is received after the first wave is transmitted from the ultrasonic transceiver.

\* \* \* \* \*